May 26, 1964  B. E. SHLESINGER, JR  3,134,300
METHOD AND APPARATUS FOR ROCKET LAUNCHING
Original Filed Jan. 26, 1962  2 Sheets-Sheet 1

INVENTOR
Bernard Edward Shlesinger, Jr.

BY Shlesinger, Shlesinger, & Arkwright
ATTORNEYS

May 26, 1964  B. E. SHLESINGER, JR  3,134,300
METHOD AND APPARATUS FOR ROCKET LAUNCHING
Original Filed Jan. 26, 1962  2 Sheets-Sheet 2

INVENTOR
Bernard Edward Shlesinger, Jr.

BY Shlesinger, Shlesinger & Arkwright

ATTORNEY

United States Patent Office  3,134,300
Patented May 26, 1964

3,134,300
METHOD AND APPARATUS FOR ROCKET LAUNCHING
Bernard Edward Shlesinger, Jr., 906 Bruce Lane, Annandale, Va.
Continuation of application Ser. No. 169,006, Jan. 26, 1962. This application July 16, 1963, Ser. No. 296,157
4 Claims. (Cl. 89—1.7)

This invention, which is a continuation of my application Serial No. 169,006 filed January 26, 1962, and now abandoned, relates to a method and apparatus for launching rocket vehicles and missles both for planetary and interplanetary travel.

Many types of launching devices have been devised for launching rockets and missiles, but considerable loss of energy is expanded to initially move the vehicle from a static to a mobile state. This great loss of energy decreases the range and effectiveness of the rocket or missile. Since most rockets of the long distance type are not fired from a tube, considerable dissipation of the reactionary forces results due to the lateral escape of gases.

One of the difficulties encountered in present day launchings, is the loss of the initial or primary stage rocket. Considerable advantages could be had both from the cost and the production standpoint, if the first stage rocket could be recovered.

There have been many proposals as to how to extend the range of the rocket such as launching the rocket while it is airborne. This of course has some limitations particularly with regard to the size of the vehicle launched. If a rocket can be launched or catapulted into the air in the same manner as an airplane is catapulted from the deck of an aircraft carrier, advantages are gained by the initial boost. The catapult launching mechanism is of course reusable.

It is therefore an object of this invention to provide an apparatus for launching rockets and missiles that allows for first stage recovery.

Another object of this invention is to provide a catapult type launching device which will increase the range of the vehicle.

Still another object of this device is to provide a first stage booster to the basic vehicle and in effect add another stage to vehicles of the type presently contemplated and used.

Another advantage of this invention is that the forward movement gained by the rocket sled will permit greater effective use of the rocket fuel since the rocket will be moving at a high speed of say 500 or more miles per hour before its own engines cut in. Initial waste of fuel to get the rocket moving with present day launching systems will therefore be eliminated.

A further object of this invention will be the reduction of weight of the vehicle because of the provision of another stage which is recoverable.

A further object of this invention is that a rocket having the same weight as the present first stage rockets would have a much longer trajectory since in effect it would have an additional booster which would be the rocket sled.

Yet another object of this invention is to provide a structure which is not complex and which can be engineered with present existing equipment.

Still another object of this invention is to eliminate ground installation damage which presently occurs when a rocket explodes on the launching pad. In this present system the rocket itself will be moving away from the launching platform prior to ignition of any of the stages.

Yet a further advantage of this invention is the elimination of high heats at the point of the launching pad thereby eliminating the necessity of having costly and expensive concrete protecting shelters as well as costly and expensive cooling systems for maintaining the pads cool at the initial stage of launch.

These and other objects of this invention will become apparent from a reading of the following specification and claims.

Figure 1:
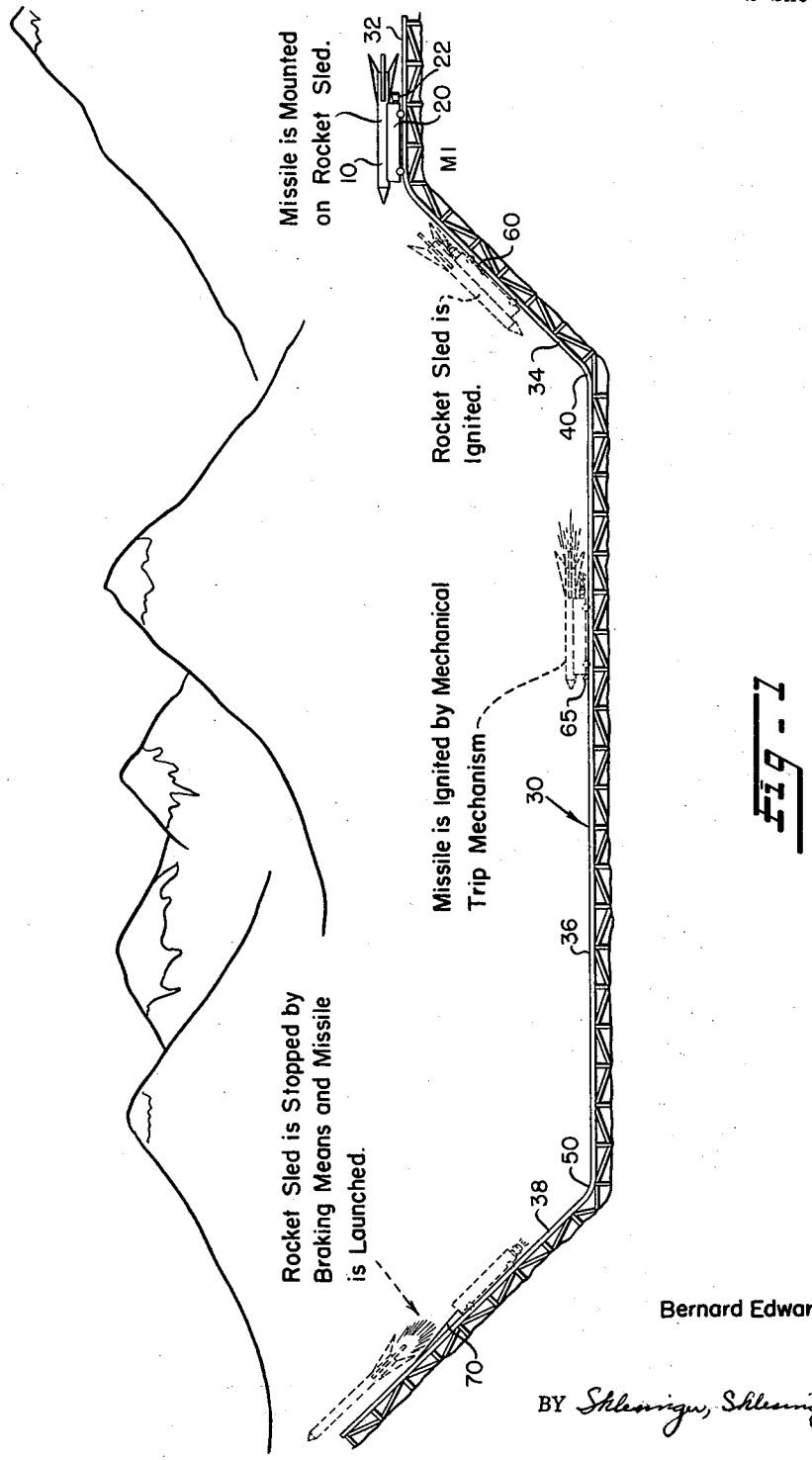
FIGURE 1 is a schematic view of the rocket launching device as it might be located in a ground position having the track laid on one side of a mountain and down through the valley and up the other side of the mountain.

In FIGURE 1, the rocket or missile 10 can be of a type which can be released and fired as set out in van Dorn 2,426,537 and is shown mounted on a rocket sled 20. Rocket sled 20 is provided with rocket nozzle 22. Rocket sleds for carrying rockets are well known e.g. Northrup 2,734,702. It is obvious that the rocket nozzle on the rocket sled will be placed in a position to prevent damage to the rocket which the sled is carrying. Shielding means for the rocket or positioning the rocket so that the sled nozzle 22 will be beyond interference with the rocket 10 is a matter of general design and has nothing to do with this invention. The rocket sled 20 is mounted on a track generally indicated as 30 having an initial starting platform 32, a downhill track portion 34, a straight track portion 36 across the valley, and an up-hill track portion 38 on the other side of the valley. It will be obvious that a track can be designed and laid according to the type of vehicle and according to the distance the vehicle is to travel. The heavier the rocket vehicle, the stronger the track must be in order to support and withstand the great loads and stresses. It is contemplated that the track may be a number of miles long in order to provide sufficient acceleration for the vehicle 10 upon release from the rocket sled 20. The angle at which the rocket is launched may be varied by obvious adjusting devices such as raising and lowering screws not shown in the track. It is also obvious that the track could be located at a specific angle by selecting a particular ridge or mount and by grading it to provide the proper angle of launch.

It is obvious that tracks 34, 36, and 38 may be inclined at any angle desired in order to get the maximum results. In any event, the downhill track is designed to take advantage of inertia thereby to build up the speed of the vehicle on the rocket sled to assure that the rocket sled is moving at a sufficient speed preferably prior to the ignition of the rocket sled engines. Some motor mechanism could be used to initially push the rocket from the track launching portion 32 to the inclined downhill portion 34. It is obvious that this could be done hydraulically or electrically as well as mechanically. It is also obvious that the rocket sled's motors may be ignited while the entire unit is on the initial launching portion of the track 32.

The rocket sled 20 need not be a conventional type vehicle with wheels as illustrated in the drawings but may be of some non-conventional type such as a monorail or skid type device which could be fluid suspended in the nature of an air bearing.

It is to be noted that FIGURE 1 shows curved portions in the track 40 and 50. It will be obvious that these curves are exaggerated for purposes of the drawings since considerable centrifugal force would have to be overcome with any sudden change of direction when the vehicle and the sled are moving at a high speed. Gradual change in the inclination of the track is desirable particularly as the vehicle progresses along the floor of the valley on the track portion 36. The initial portion of the track 34 meeting with the valley portion 36 of the track need not require as gradual a grade change since the high speeds will not have been built up at this point. The primary purpose of this initial downhill stage is to gain sufficient momentum to provide proper ignition of the sled's rocket engines without causing harm to the track or other installations in the vicinity thereof. This is considerably different from the static type operations used for example at Cape Canaveral. In the Cape Canaveral operations, considerable shielding and heavy equipment is necessary to prevent destruction of equipment by high heats.

This is because the motors are firing for a period of time before the lift off. In the structure of this invention, no water cooling mechanisms would be required at the launch platform 32.

The degree of change of inclination as mentioned above would of course depend upon the sensitivity of the electrical and other equipment being used. In order to minimize the "G" forces on the rocket, the rocket could be mounted on the sled in a sling (not shown) which would permit a change of the angle of attack of the rocket with reference to the track though the rocket sled 20 itself would not change position. This of course would help to reduce some of the undesirable force components on the sensitive guidance equipment particularly at those places where the angle of change in the track is substantial. The problem of mounting the rocket in a sling which is pivoted, would of course be more complex with the heavier devices but would operate in much the same manner as the elevating mechanism for the gun barrel in an artillery piece or cannon. In any event, the "G"-forces should not at any time develop beyond the capabilities of the equipment being launched. Knowledge of the sensitivity of the equipment, the structural strength of the equipment, and the change in inclination of the track, would be factors in determining the maximum speed at which the vehicle could traverse the track at any particular portion.

The downward incline of the track can be relatively steep presenting a gradual curve as the track reaches the bottom of the valley. A gradual incline of 5 degrees per mile over the valley floor would eventually result in a 65 degree launching trajectory if the track extended from the valley floor 13 miles. This would be a sufficient incline for many trajectories and would eliminate the necessity of having to have certain guidance system to tilt the rocket to its proposed trajectory after launching from the standard rocket pad.

Because of the somewhat permanent nature of this structure, military installations would be more vulnerable to attack; nevertheless, the advantages of this type of installation will be quite obvious with respect to commercial travel since the track could be laid and the angle of inclination set for a particular distance to be traveled for striking the target with the maximum accuracy. This would be particularly important with regard to space travel shots of probe and interplanetary space types.

In FIGURE 1, the track is shown provided with the rocket 10 igniting mechanism 60 and the rocket sled braking mechanism 70. No initial ignition mechanism is shown though the track could be equipped with such trip mechanism It is also obvious, that radio equipment could ignite the engines of both the rocket sled 20 and the rocket 10 at the proper time intervals without the necessity of having some type of trip mechanism on the track.

The rocket sled braking means may be a shock absorbing bumper 70 which slows the forward travel of the rocket sled 20 or it may be a water type brake such as used in braking rocket sleds which in the past have been used to test the reaction of humans at high speeds particularly with regard to bail-out effects. Many other types of braking mechanisms could also be devised. It is obvious that the rocket sled 20 could be propelled from the end of the track 30 and recovered by means of a parachute which would be opened to carry the sled gently to to the ground after it has left the track and subsequent to its separation from the rocket vehicle 10.

*Modification*

Figure 2:
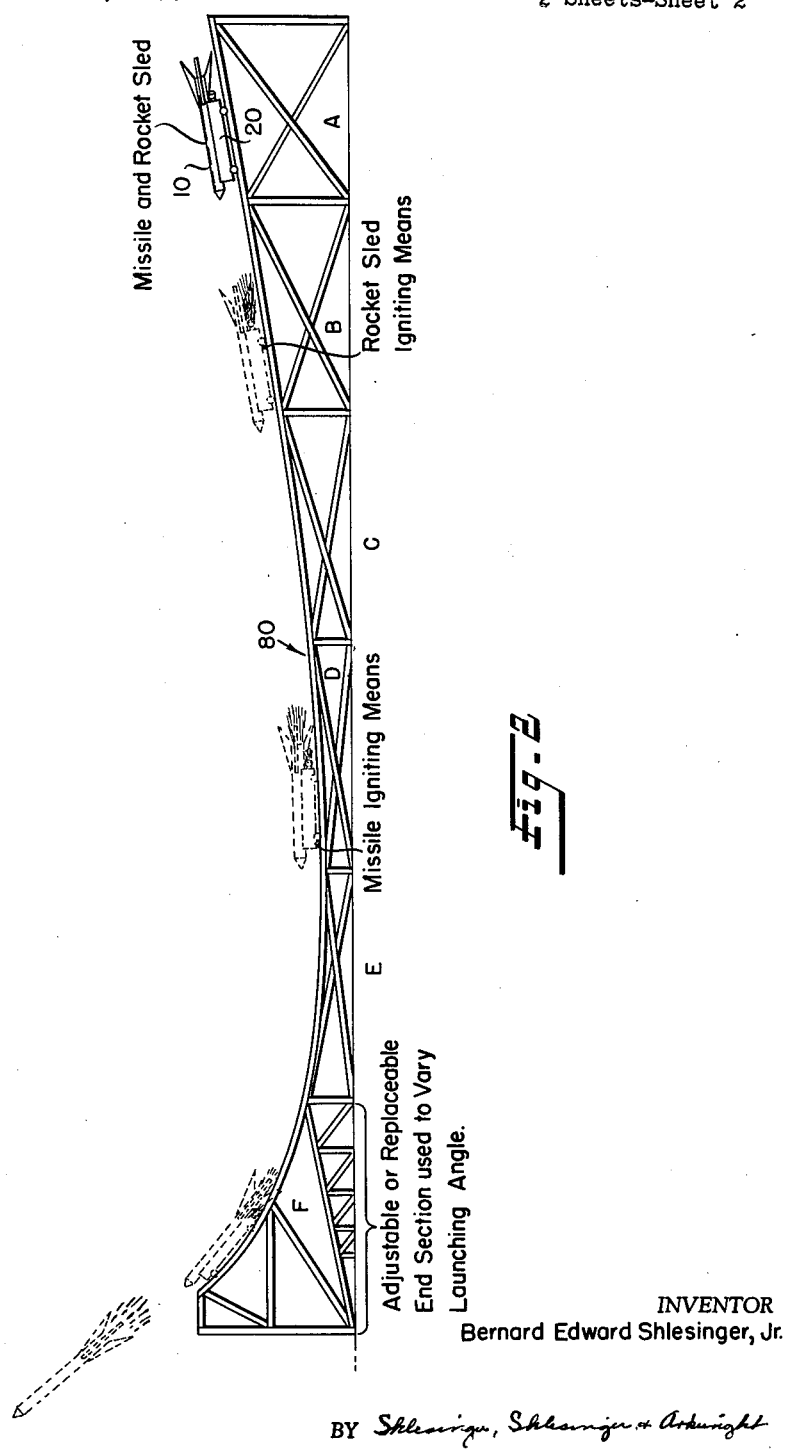
FIGURE 2 is a schematic view of a modification of this invention showing a track which could be developed without taking advantage of a mountainous terrain.

FIGURE 2 shows a modified form of the rocket launching device. In this modification the rocket 10 is mounted on the rocket sled 20. The sled 20 is mounted on a track which is set upon a platform 80 comprising a number of sections such as A, B, C, D, E and F. These sections are movable and can be readily transported from one place to another. The sections are designed to be used in areas where the terrain is flat or substantially so.

In FIGURE 2, section F is designed so that the track may be raised or lowered by any suitable mechanism such as hydraulic raising and lowering devices. The raising and lowering of the track permits the rocket to be launched at different angles. It will also be obvious that the section F may be replaced with a section carrying track mounted at a different angle to permit variation in launching angle of the rocket.

In the apparatus of FIGURE 2, a braking means would not be necessary and a parachute can be built into the rocket sled 20 to permit recovery of the rocket sled.

In both FIGURE 1 and FIGURE 2, suitable release means is provided for separating the rocket 10 from the rocket sled 20. It may be qiute simple and merely a basic cradle. As the rocket develops its own speed and power beyond that of the rocket sled, the rocket will advance forward and lift from the cradle and no longer be supported by the sled once having attained sufficient speed to maintain itself in flight.

*Operation*

The operation of this invention is as follows:

The rocket 10 is mounted on the rocket sled 20 in position on either the track shown in FIGURE 1 or the track shown in FIGURE 2. In FIGURE 2 some restraining mechanism will be necessary to maintain the rocket 10 and sled 20 in position prior to release for the downward travel. In FIGURE 1, a push or pull mechanism will shove the rocket sled forward to the inclined section of the track 34 and thence the rocket sled 20 will proceed on the downhill slope 34 until it reaches the point where the rocket sled is ignited preferably at a speed of at least 100 miles per hour although it may be less with large vehicles. At the point of ignition of the rocket sled's engines the sled will continue to accelerate under both the engine thrust and the influence of gravity. The sled may be initially accelerated downhill to a high rate of speed by a standard motor mechanism or a tow rope type accelerating device or the like. The sled may reach a speed of several hundred miles an hour prior to ignition of the rocket sled engine as at 65 of FIGURE 1. The rocket sled engine and rocket engine will then accelerate the sled 20 with the rocket mounted thereon to a much higher rate of speed of perhaps 500 to 1000 or more miles per hour. The vehicle will continue in conjunction with the rocket sled until the rocket sled's acceleration diminishes to a point where the rocket itself moves forward of the sled and disconnects therefrom. The rocket sled will be recaptured and reused whereas the missile will continue its travel towards its destination.

It will be obvious that the drawings are merely illustrative of the basic principle. The ignition points for the rocket sled 20 and the vehicle 10 may vary considerably depending upon distance and target. It is quite probable that the rocket 10 itself would not be ignited until the missile has reached the end of the track 38. It is also quite possible that the rocket sled may not be ignited until after it is passed on to the track section 36.

In effect, the vehicle is propelled much in the same sense as a sling shot propels a missile therefrom. It is also similar to the technique called "throw-bombing."

In this procedure, a plane goes into a dive and then pulls up out of the dive gaining the terrific speed advantage of the dive. A bomb is then released on the upturn of the dive which in effect throws the bomb upward and outward in order to cause it to take a trajectory similar to that of a shell being fired from a gun. This causes the missile to hit the target a great distance from the release and enables the aircraft to be on its ways out of the area particularly when a nuclear bomb is involved.

While the invention has been described, it will be understood that it is capable of further modifications and this application is intended to cover any variations, uses, or adaptations of the invention following in general, the principles of the invention and including such departures from the present disclosure as come within known or customary practice in the art to which the invention pertains, and as may be applied to the essential features hereinbefore set forth and as fall within the scope of the invention or the limits of the appended claims.

Having thus described my invention, what I claim is:

1. A rocket launcher for use on natural mountain terrain including:
   (a) starting platform on the side of a mountain opposite to a second mountain there being a valley between said mountains;
   (b) a downhill track extending from said starting platform and running down the side of said mountain a considerable distance to the floor of said valley;
   (c) a valley track connected to said downhill track running across said valley and extending a considerble distance across the floor of said valley and having a gradual continuous incline from the bottom of said valley;
   (d) an uphill track connected to said valley track and extending a considerable distance up the side of said second mountain and having a gradual incline;
   (e) a rocket sled mounted on said track;
   (f) a rocket on said sled;
   (g) means for moving said sled from a standing position on said starting platform and initially accelerating said sled down the downhill tracking including an auxiliary non-rocket type starting motor;
   (h) means for igniting said rocket sled's engine on said downhill track for constantly accelerating said sled for a considerable distance across the valley and up the side of said second mountain.
   (i) means for igniting said rocket's engine subsequent to the ignition of said rocket sled's engine and after said sled has passed onto said valley track and while said rocket sled is under acceleration; and
   (j) means for releasing said rocket from said sled on said uphill track at a considerable angle corresponding to the angle of incline of said uphill track, at such time as said rocket's engines can mantain constant acceleration of said rocket independent of the acceleration forces of said sled to thereby launch said rocket.

2. A rocket launcher for use on natural mountain terrain as in claim 1 including,
   (a) braking means for said sled.

3. A rocket launcher for use on natural mountain terrain as in claim 1 including,
   (a) braking means for said sled, and
   (b) means for recovering said sled.

4. A rocket launcher for use on natural mountain terrain as in claim 1 and said gradual incline being about 5° per mile.

No references cited.